Oct. 2, 1928.
J. N. ARMSTRONG
1,686,401
DIRIGIBLE HEADLIGHT
Filed June 3, 1927     2 Sheets-Sheet 1
Fig. 1
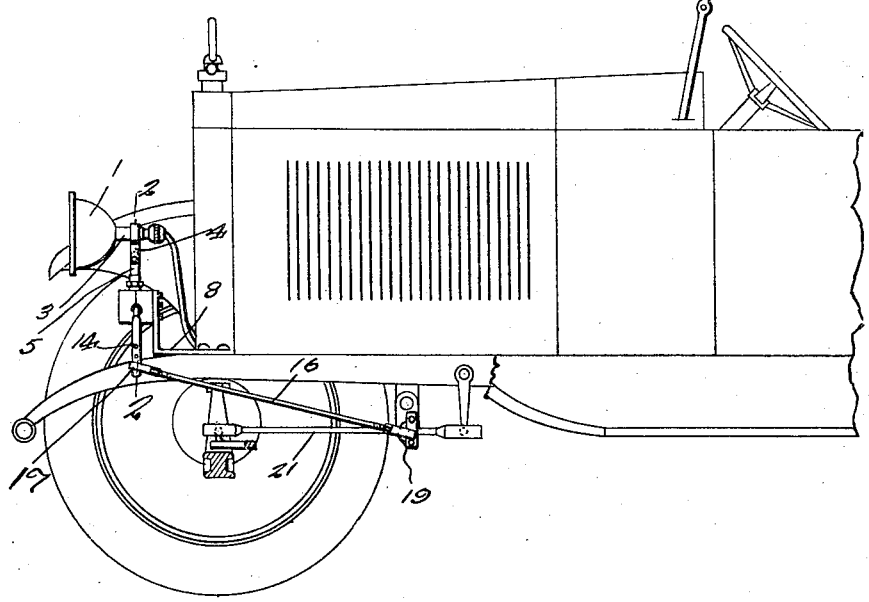
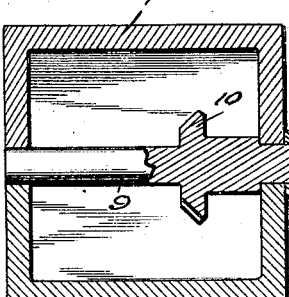
Fig. 2
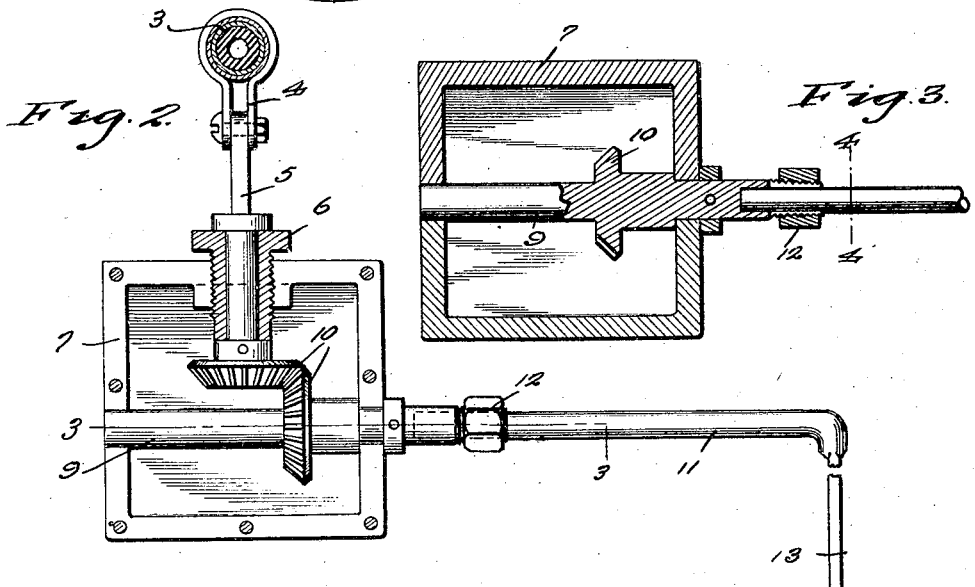
Fig. 4
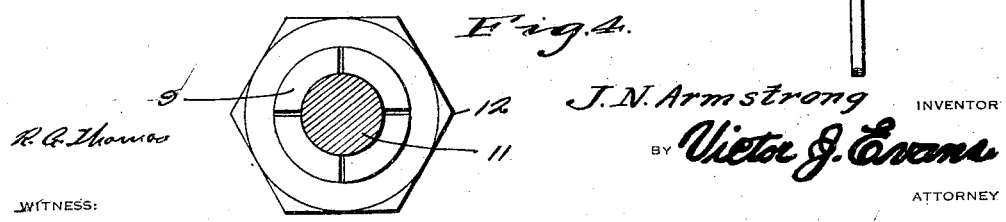
J. N. Armstrong, INVENTOR
BY Victor J. Evans
ATTORNEY
WITNESS:
R. G. Thomas Oct. 2, 1928.

J. N. ARMSTRONG

DIRIGIBLE HEADLIGHT

Filed June 3, 1927

J. N. Armstrong INVENTOR

BY Victor J. Evans

ATTORNEY

WITNESS:

Patented Oct. 2, 1928.

1,686,401

UNITED STATES PATENT OFFICE.

JOHN NELSON ARMSTRONG, OF NEW CASTLE, PENNSYLVANIA.

DIRIGIBLE HEADLIGHT.

Application filed June 3, 1927. Serial No. 196,348.

This invention relates to dirigible lamps for motor vehicles and the like, the general object of the invention being to arrange a lamp at the front of the vehicle in such a manner that it can rotate about a vertical axis, with means for connecting the standard of the lamp to a part of the steering mechanism so that the lamp will be turned when the steering mechanism is actuated to turn the front wheels of the vehicle, thus causing the lamp to illuminate the road on turns as well as on straight portions, and to eliminate glare of lights on curves to motorists coming in the opposite direction.

Another object of the invention is to so arrange the parts that they can be readily attached to existing models of vehicles without changing the parts thereof.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is an elevation, with parts in section, showing the application of the invention to an automobile.

Figure 2 is a section on line 2—2 of Figure 1.

Figure 3 is a section on line 3—3 of Figure 2.

Figure 4 is a section on line 4—4 of Figure 3.

Figure 7:
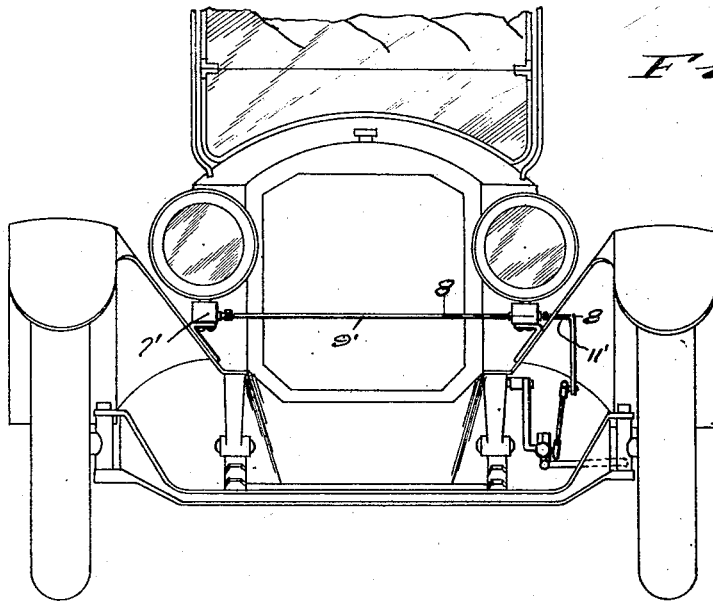
Figure 7 is a front view of an automobile, showing the invention applied to the lamps thereof.

In these drawings, 1 indicates an auxiliary lamp which has its tubular part 3 engaged by a clamp 4 which is adjustably connected to a standard 5 which is rotatably held in a bushing 6 threaded in the top of a casing 7 which is supported from a part of the vehicle by a bracket 8. A horizontal shaft 9 is journaled in the casing and has one end projecting therefrom and this shaft is geared to the lower end of the standard 5 by the bevel gears 10. By threading the bushing in the casing 7, it may be adjusted so that the bevel gear on standard 5 may be adjusted into bevel gear on shaft 9 to take up back lash between gears to hold lamp rigid and to take up wear as needed, and by making the clamp 4 adjustable on the standard, the lamp can be tilted to direct the rays of light as desired.

A shaft 11 has one end inserted in a split socket in the outer end of the shaft 9 and said shaft is held in the socket by a nut 12 engaging threads on the exterior of the socketed part, said nut acting to cause the split portion of the socket part to grip the shaft 11. The shaft 11 is bent at right-angles and this part is flattened, as at 13, and the flattened part is provided with a number of holes 14, any one of which is adapted to receive the threaded end of a spherical headed bolt 15, the head of which is fastened to a link or rod 16 by a sleeve 17 threaded to the end of the rod and carrying a pair of members 18 which are recessed to receive portions of the head, the head passing through a lateral hole formed in the sleeve. As will be seen, this arrangement of parts acts somewhat like a universal joint between the rod 16 and the shaft 11.

A similar arrangement is provided at the other end of the rod 16, as shown at 19, but at this end the bolt 15' is carried by one member of a clamp 20 which is clamped to the drag link 21 of the steering mechanism of the vehicle.

From the foregoing it will be seen that when the steering mechanism is actuated to steer the vehicle, the movement of the drag link 21 will be communicated to the shaft 11 through the rod 16 so that said shaft 11 and the shaft 9 will be given a partial rotary movement which will be communicated to the lamp standard through the gears 10 and thus the lamp will be moved about a vertical axis and its rays of light will illuminate the road as the vehicle is making a turn.

Figure 8:
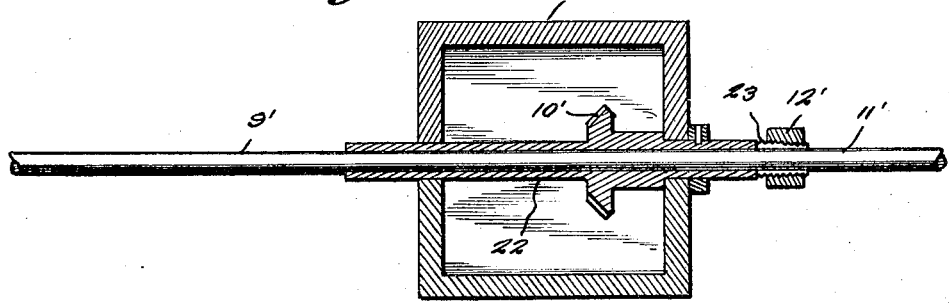
Figure 8 is a section on line 8—8 of Figure 7.
Figure 6:
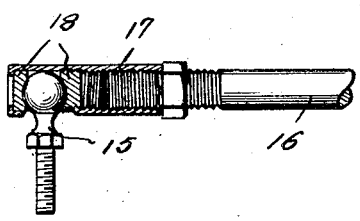
Figure 6 is a sectional view through one end of the adjustable link.
Figure 5:
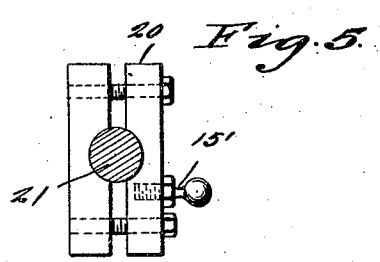
Figure 5 is a view showing the clamp on the drag link for connecting the adjustable link forming part of the invention to said drag link.

Figures 7 and 8 show the invention applied to the regular headlamps of a vehicle, and in this case I provide a housing 7' for each lamp in which the standard of the lamp is rotatably supported as before described. The shaft 9' extends through both housings and it has a gear 10' thereon in each housing, these gears meshing with the gears of the standards. Figure 8 shows the gear of the left hand housing formed on a tubular shaft 22 which is fastened to the shaft 9' and through which the shaft 9' passes, the shaft 11' being connected with the outer end of the shaft 22 by the nut 12' and the split socket 23, as before described.

In this form of the invention, both headlamps of the vehicle are moved when the steering mehcanism is moved.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:

A dirigible lamp for vehicles comprising a casing, means for attaching it to a vehicle, said casing having a threaded hole in its top, an exteriorly threaded bushing passing through said hole, a lamp standard rotatably supported in the bushing and held against longitudinal movement therein, a lamp, a clamp engaging a part thereof, a horizontal pivot connecting the clamp with the upper end of the standard, a horizontal shaft rotatably arranged in the casing, gears connecting said shaft with the lower end of the standard, one end of the shaft extending through the casing and having a split socket therein, an arm fitting in the socket, clamping means for holding the arm in the socket, said arm having its outer end bent and a link connecting the bent end of the arm with the drag link of the steering mechanism of the vehicle.

In testimony whereof I affix my signature.

JOHN NELSON ARMSTRONG.